United States Patent [19]

Parlatore et al.

[11] Patent Number: 5,125,527
[45] Date of Patent: Jun. 30, 1992

[54] BOX WITH KNOCK-OUTS FOR BUILD-IN EQUIPMENT, IN PARTICULAR ELECTRICAL EQUIPMENT

[75] Inventors: Roger Parlatore, Condat; Jacques da Rocha, Panazol; Christian Combas, Ambazac, all of France

[73] Assignee: Legrand, Limoges, France

[21] Appl. No.: 707,282

[22] Filed: May 28, 1991

Related U.S. Application Data

[63] Continuation of Ser. No. 486,206, Feb. 28, 1990, abandoned.

[51] Int. Cl.⁵ .................. B65D 51/22; H02G 3/08
[52] U.S. Cl. ............................ 220/266; 220/270; 220/276; 220/3.2; 220/3.8; 174/65 R
[58] Field of Search ............ 220/266, 276, 270, 274, 220/284, 241, 242, 3.8, 3.2; 174/65 R, 65 G, 67, 66

[56] References Cited

U.S. PATENT DOCUMENTS

| | | | |
|---|---|---|---|
| 1,646,622 | 10/1927 | Mason | 220/266 |
| 1,962,317 | 6/1934 | Mangin | 220/284 |
| 1,980,831 | 11/1934 | Rosenfield | 220/284 |
| 2,068,988 | 1/1937 | Knell . | |
| 2,357,754 | 9/1944 | Moll | 220/3.2 |
| 2,574,382 | 11/1951 | Falson | 220/266 |
| 3,333,501 | 8/1967 | Pitcher | 174/65 R |
| 3,773,209 | 11/1973 | Schane | 220/276 |
| 4,087,018 | 5/1978 | Tebbutt | 220/270 |
| 4,103,101 | 7/1978 | Maier | 174/65 R |
| 4,149,028 | 4/1979 | Gressitt et al. | 174/65 R |
| 4,389,535 | 6/1983 | Slater et al. | 220/3.2 |
| 4,649,230 | 3/1987 | Nielson | 220/266 |
| 4,819,819 | 4/1989 | Robertson | 220/270 |
| 4,948,441 | 8/1990 | Peck | 220/266 |

FOREIGN PATENT DOCUMENTS

| | | | |
|---|---|---|---|
| 1254295 | 5/1989 | Canada | 174/65 R |
| 1532466 | 5/1973 | Fed. Rep. of Germany | 220/270 |
| 2140886 | 1/1973 | France . | |
| 8501396 | 3/1985 | PCT Int'l Appl. . | |
| 2057782 | 4/1981 | United Kingdom | 174/65 R |
| 2216063 | 10/1989 | United Kingdom | 220/276 |

Primary Examiner—Stephen Marcus
Assistant Examiner—S. Castellano
Attorney, Agent, or Firm—Longacre & White

[57] ABSTRACT

A box for equipment to be built into a wall or the like comprises at least one inlet provisionally closed by a knock-out. The knock-out is delimited by a line of reduced strength. A pull member is fastened to it to facilitate the application of a traction force to it.

14 Claims, 1 Drawing Sheet

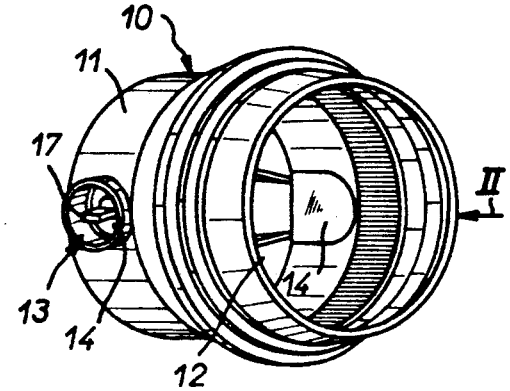
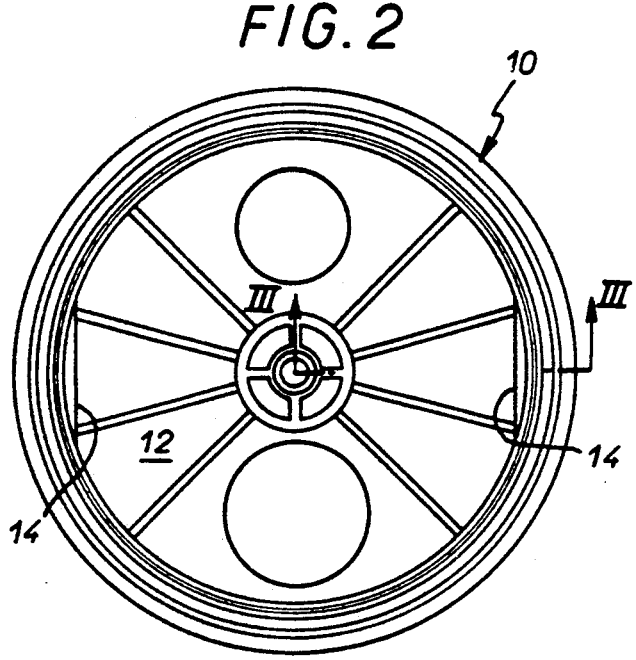
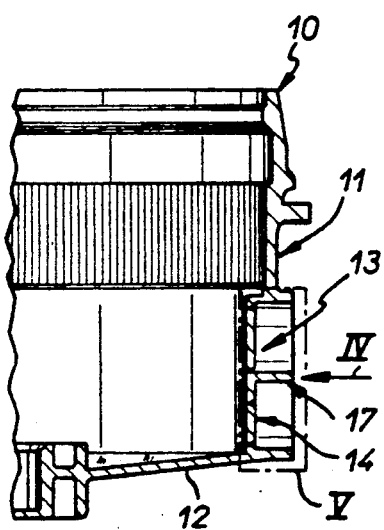
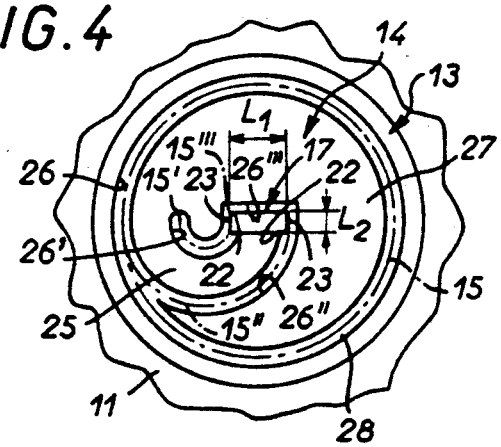
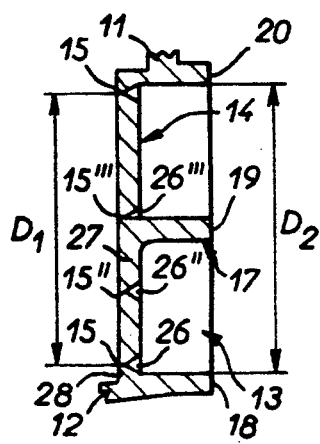
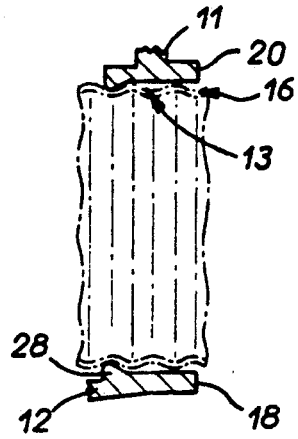
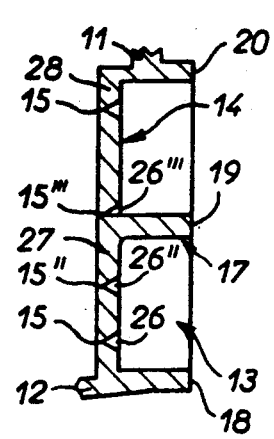

BOX WITH KNOCK-OUTS FOR BUILD-IN EQUIPMENT, IN PARTICULAR ELECTRICAL EQUIPMENT

This application is a continuation of application Ser. No. 486,206, filed Feb. 28, 1990.

BACKGROUND OF THE INVENTION

1. Field of the invention

The present invention is generally concerned with boxes sometimes called prefabrication boxes which, during the construction of an external or an internal wall, are fitted to the corresponding sheeting or shuttering before the concrete is cast so as to provide in the latter the necessary space for accommodating an equipment, for example an electrical equipment such as an electrical socket outlet or switch to be built into the wall.

It is more particularly directed to the situation where, for the purpose of connecting to the box a conduit to accommodate electrical conductors connected to the equipment concerned, there is provided on the side wall or on the back of the box an inlet providing access from the conduit to its interior space.

In practise a plurality of such inlets are provided so that the installer can choose which is the most suitable for the specific orientation of the conduit to be installed.

To prevent the box filling up when the concrete is cast any unused inlets have to be covered.

This therefore applies systematically to all inlets on a box as manufactured.

To remove the cover from the inlet that is to be used it is possible to cut it away using a special machine or a knife.

However, use of a special machine presupposes its presence on the worksite.

Cutting with a knife may cause damage if the operation is not done properly.

It has also been proposed to use knock-out covers, each being delimited by a line of reduced strength.

At present any such knock-out is removed by pushing it in or out.

As with cutting by means of a knife, this operation may cause damage if it is not carried out properly.

A general object of the present invention is an arrangement whereby it is possible to avoid such damage.

SUMMARY OF THE INVENTION

The present invention consists in a box for equipment to be built into a wall or the like comprising at least one inlet provisionally closed by a knock-out delimited by a line of reduced strength on which knock-out there is provided a pull member fastened to it and adapted to facilitate the application of a traction force to it.

By virtue of this pull member, which in practise is in one piece with the knock-out, the latter is removed by a simple tearing movement and no longer by pressing in or out or cutting out.

U.S. Pat. No. 2.068.998 discloses an element, in this instance an auxiliary knock-out, adapted to be raised relative to a knock-out.

This auxiliary knock-out does not constitute a pull member in the sense of the present invention, even when it is raised.

Apart from the fact that its initial projection from the main knock-out is insufficient for it to be grasped directly and that, once traction were exerted on it when raised this could only result in detaching it from the main knock-out, this auxiliary knock-out has no other function than to provide in the main knock-out an opening adapted to allow the insertion of a tool to operate on it thereafter.

The pull member in accordance with the invention, on the other hand, makes it possible to apply traction directly to the knock-out to be removed.

The pull member is preferably in the form of a solid stud the transverse cross-section of which comprises two parallel flats, this transverse cross-section being rectangular, for example.

This facilitates and strengthens grasping of the pull member which may advantageously be performed with pliers, a common worksite tool, the gripping of a pull member of this kind between the jaws of a pair of pliers being advantageously favored by the presence of flats on the pull member.

The pull member is preferably fastened to a tongue defined on the knock-out by lines of reduced strength and extending initially, for example, substantially along a radius of the knock-out before then merging substantially tangentially with its peripheral contour.

This facilitates tearing away of the knock-out, such tearing concerning initially only the tongue which is preformed in it and requiring only a minimal initial effort before extending thereafter to the entire knock-out.

The resulting control over the tearing force is favorable to obtaining a perfectly regular edge for the inlet opened by removing the knock-out initially closing it off.

According to one feature of the invention benefit is drawn from this regular edge to enable snap-fastener manner attachment to the box of the conduit to be inserted into it by means of an inlet of this kind.

To this end, the line of reduced strength delimiting the knock-out resulting from a groove recessed into its surface, the bottom of this groove is set back in the radial direction relative to the periphery of the knock-out.

As a result, after removal of the part of the knock-out delimited by the groove the remaining peripheral portion of the knock-out forms an annular lip projecting towards the axis of the inlet and adapted to retain the conduit inserted into that inlet, especially if, as is usually the case, it is a corrugated tube.

The characteristics and advantages of the invention will emerge from the following description given by way of example with reference to the appended diagrammatic drawings.

BRIEF DESCRIPTION OF THE DRAWINGS

FIG. 1 is a perspective view of a box in accordance with the invention.

FIG. 2 is a plan view of it to a larger scale as seen in the direction of the arrow II in FIG. 1.

FIG. 3 is a partial view of it in axial cross-section on the line III—III in FIG. 2.

FIG. 4 is a partial view of it in elevation to a still larger scale and as seen in the direction of the arrow IV in FIG. 3.

FIG. 5 is a partial view in axial cross-section to the same scale as FIG. 4 of the detail from FIG. 3 indicated by a box V in FIG. 3, before removal of the knock-out concerned.

FIG. 6 is a partial view in axial cross-section similar to that of FIG. 5, after removal of the knock-out.

FIG. 7 is to that of FIG. 6 for an alternative embodiment.

DETAILED DESCRIPTION OF THE INVENTION

As shown in the figures, the box in accordance with the invention is a "prefabrication box" for equipment to be built into a wall or the like, in particular electrical equipment. It is designed to be embedded in the mass of concrete constituting an external or an internal wall to be equipped with such equipment. In the known way, it comprises, in addition to an equipment that is not shown in the figures and will not be described here because it forms no part of the present invention, a box body 10 with a side wall 11 and back 12.

In the embodiment shown the cross-section of the box body 10 is circular.

To simplify matters, the box in accordance with the invention will usually be regarded in the following description as equivalent to its box body 10 only, and only its component parts necessary to understanding the invention will be described.

In the known way the box in accordance with the invention comprises at least one inlet 13 with a knock-out 14 delimited by a line 15 of reduced resistance closing off the inlet 13.

As shown in chain-dotted outline in FIG. 6, the inlet 13 has a circular transverse contour reflecting that of a conduit 16 with a circular transverse contour and adapted to accommodate electrical conductors and to be inserted into the box body 10 at installation time. The same goes for the knock-out 14 closing it off.

In the embodiment shown the conduit 16 is a corrugated tube.

In this embodiment two inlets 13 are provided at diametrally opposed positions on the side wall 11 of the box body 10 in the immediate proximity of its back 12.

In accordance with the invention, the knock-out 14 closing off an inlet 13 is equipped with a pull member 17 which is fastened to it and which is adapted to facilitate the application of a traction force to it.

In practise the pull member 17 is in one piece with the knock-out 14 concerned and is in the form of a solid stud upstanding from the central area of the knock-out 14 and extending substantially perpendicular to the plane of the latter. As shown, the knock-out 14 forms the back of a well 18 which projects from the external surface of the wall 11 and the corresponding pull member 17 projects from the external surface of the knock-out 14 and the free end 19 of the pull member 17 is preferably substantially level with the outlet 20 of the well 18.

As shown, the transverse cross-section of the pull member 17 preferably includes two parallel flats 22.

In practise this transverse cross-section is rectangular and the flats 22 form its two longer sides.

In the embodiment shown the flats 22 constituting in this way the longer sides of the transverse cross-section of the pull member 17 have a length L1 that is at least twice that L2 of the shorter sides 23 of this transverse cross-section. As shown, the pull member 17 is preferably fastened to a tongue 25 predefined by lines 15', 15" of reduced strength in the knock-out 14.

In the embodiment shown the tongue 25 originates from the pull member 17 and initially extends substantially along a radius of the knock-out 14, substantially perpendicularly to the lengthwise direction of the transverse cross-section of the pull member 17; it then merges substantially tangentially with the peripheral contour of the knock-out 14.

Each of the lines of reduced strength 15', 15" delimiting it extends on a respective concentric semi-circle of which one corresponds to the line 15' of reduced strength and constitutes a dead end while the other merges tangentially with the circle around which the line 15 of reduced strength extends; disposed one on each side of the pull member 17, they merge through a line 15''' of reduced strength.

In practise, the lines 15, 15', 15", 15''' of reduced strength are the result of grooves 26, 26', 26", 26''' recessed into the external surface of the knock-out 14 and they are so to speak materially represented by the back of the latter.

The back of the groove 26 producing the line 15 of reduced strength delimiting the knock-out 14 is preferably set back in the radial direction relative to the periphery of the knock-out 14.

In other words, the back of this groove lies on a circumference of diameter D1 less than the diameter D2 of the circumference along which extends the inside surface of the well 18 which delimits the knock-out 14; for the latter, it forms a boundary between a central portion 27 with which the tongue 25 is continuous and a peripheral portion 28 in contact with the internal surface of the wall 18.

At least the flank of the groove 26 which is on the same side as the periphery of the knock-out 14 is oblique to the axis of the inlet 13 concerned, approaching this axis as it diverges from said periphery.

In the embodiment shown the other flank of the groove 26 is also oblique to the axis of the inlet 13, but in the opposite sense to the previously discussed flank.

The arrangements are similar for the grooves 26', 26".

For the groove 26''', on the other hand, only one of the flanks is oblique to the axis of the inlet 13, the other flank being continuous with the corresponding flat 22 of the pull member 17 and therefore extending parallel to this axis.

As will be readily understood, the box body 10 constituted in this way may advantageously be made by molding it in one piece from a man-made material.

To facilitate molding the knock-out 14 of each inlet 13 projects inwardly of the volume delimited by its lateral wall 11, the two knock-outs being parallel on chords of the lateral wall 11. Each is delimited by an arch-shape contour whose parallel branches directed towards the back 12 merge in a semi-circle opposite the latter.

To remove the knock-out 14 closing an inlet 13 it is sufficient to apply to the corresponding pull member 17, using a pair of pliers, for example, sufficient traction first to tear progressively the tongue 25 to which the pull member 17 is attached and then all of the central portion 27 of the knock-out 14 with which the tongue 25 is continuous.

As shown in FIG. 16, the peripheral portion of the knock-out 14 then remains on the internal surface of the well 18 projecting radially towards the axis of the inlet 13.

It forms a circular lip 28 onto which, as schematically represented in chain-dotted outline in FIG. 6, the conduit 16 may be snap-fastened by virtue of the corrugated configuration of the tube constituting it.

If the conduit 16 is a tube with a screwthreaded end rather than a corrugated tube it can equally well be engaged with lip 28, screw fashion.

In the embodiment shown in FIG. 6 the lip 28 projects level with the inside surface of the well 18.

As an alternative (FIG. 7) it may have a substantial dimension in the radial direction.

Of course, the present invention is not limited to the embodiments described and shown but encompasses an variant execution thereof.

In particular, the number of inlets that the box in accordance with the invention comprises is immaterial and the inlets may be provided not only on the side wall of the box but also on its back.

There is claimed:

1. Box for equipment to be built into a wall, comprising at least one inlet, a knock-out provisionally closing off said inlet, at least one line of reduced strength delimiting said knock-out, a pull member permanently affixed to said knock-out and protruding substantially outwardly from said knockout, and said pull member being adapted to be gripped and pulled to remove said knock-out, said pull member being joined to a tongue defined by said at least one line of reduced strength delimiting said knock-out, said at least one line of reduced strength being progressively tearable by pulling on said pull member.

2. Box according to claim 1 wherein said pull member is in one piece with said knock-out.

3. Box according to claim 1 wherein said pull member is a solid stud.

4. Box according to claim 3 wherein said knock-out lies generally in a plane and said pull member protrudes outwardly in a direction substantially perpendicular to said plane.

5. Box according to claim 4 wherein said knock-out forms a back end of a well, said pull member having a free end, said free end being substantially level with an outlet of said well.

6. Box according to claim 3 wherein said pull member has two spaced parallel flats.

7. Box according to claim 6 wherein said pull member is of rectangular transverse cross section.

8. Box according to claim 7 wherein the length of one pair of opposed sides of the transverse cross-section of said pull member is at least twice that of the other pair of opposed sides of the transverse cross section.

9. Box according to claim 1 wherein said pull member is upstanding from a central area of said knock-out.

10. Box according to claim 1 wherein said tongue is predefined by said one line of reduced strength in said knock-out.

11. Box according to claim 10 wherein the knock-out has a peripheral contour, said tongue initially extending substantially radially of said knock-out and ultimately merging substantially tangentially to the peripheral contour of said knock-out.

12. Box according to claim 1 wherein said knock-out has a periphery, said line of reduced strength delimiting said knock-out comprising a groove recessed in a surface thereof, said groove having a back extending radially inwardly relative to said periphery of said knock-out so that between said periphery of said knock-out and said back of said groove a circular lip is defined for snap-fastening or screwing a conduit after said knock-out is removed.

13. Box according to claim 12 wherein said lip has a substantial dimension in the radial direction of said knock-out.

14. Box according to claim 12 wherein said groove has at least one flank on the same side as the periphery of the knock-out which is oblique relative to an axis of the inlet, said one flank being directed toward said axis as it extends away from said periphery.

* * * * *